Apr. 24, 1923.

A. SCHOEN

HEEL CUTTING MACHINE

Filed Aug. 12, 1922

WITNESSES

INVENTOR
Adolf Schoen
BY
ATTORNEYS

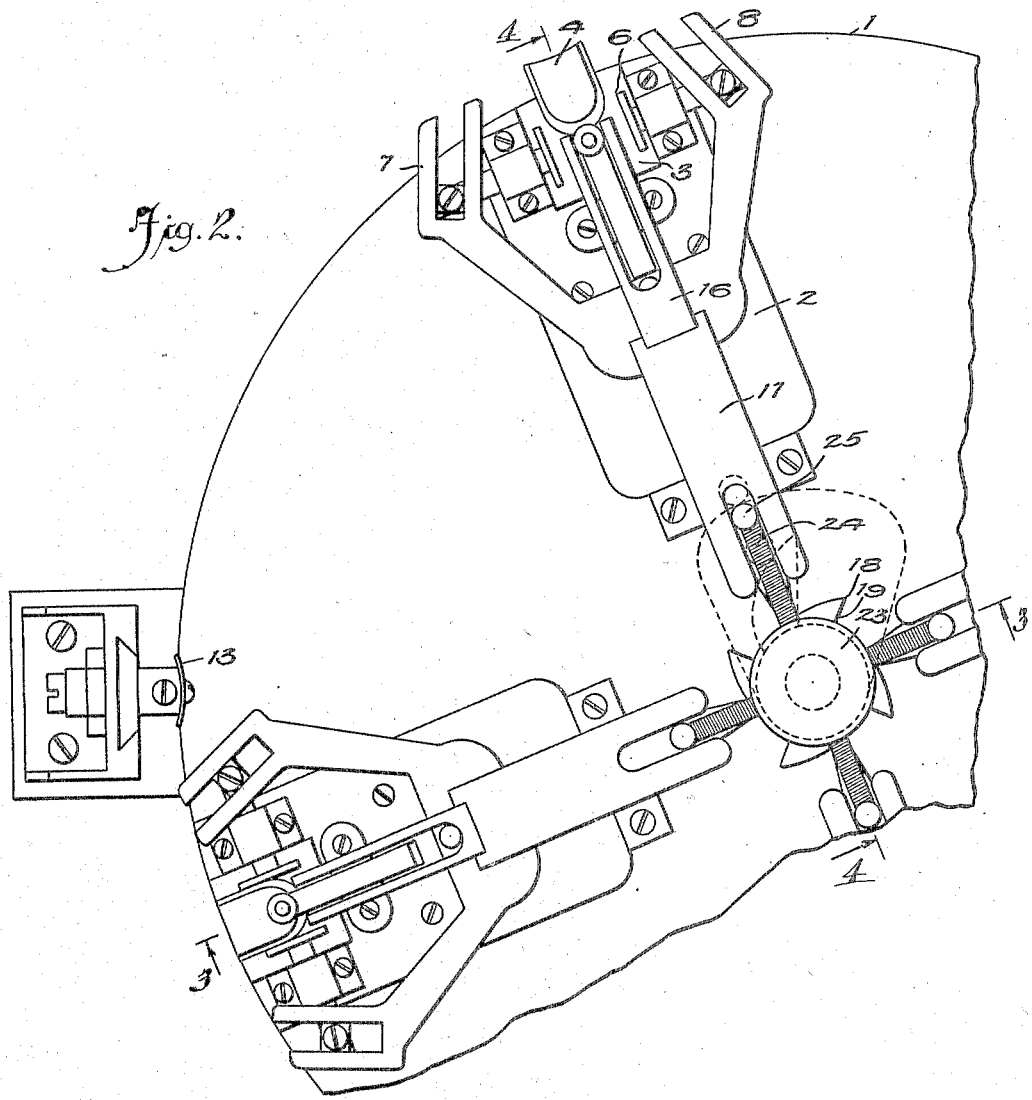
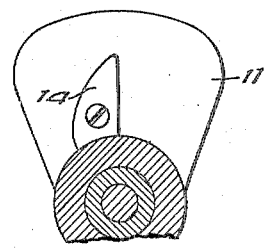

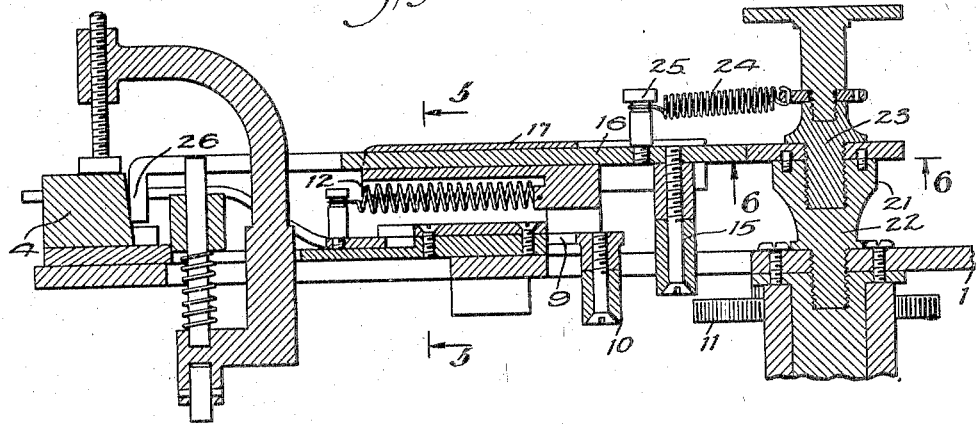
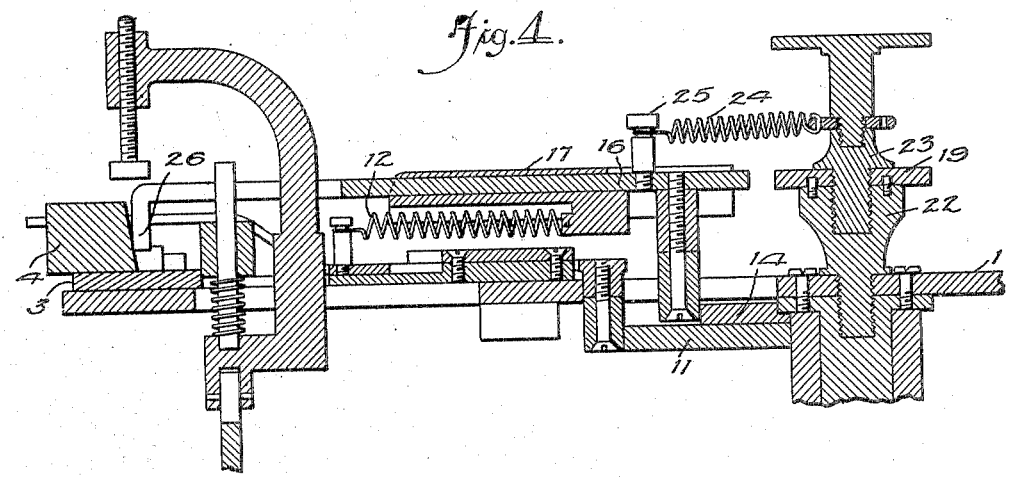
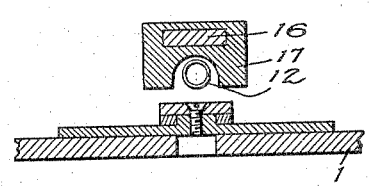
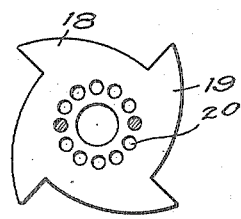

Patented Apr. 24, 1923.

1,453,192

UNITED STATES PATENT OFFICE.

ADOLF SCHOEN, OF NEW YORK, N. Y.

HEEL-CUTTING MACHINE.

Application filed August 12, 1922. Serial No. 581,506.

*To all whom it may concern:*

Be it known that I, ADOLF SCHOEN, a citizen of the United States, and a resident of the city of New York, borough of the Bronx, in the county of Bronx and State of New York, have invented a new and Improved Heel-Cutting Machine, of which the following is a full, clear, and exact description.

This invention relates to heel-cutting or breasting machines, and has for an object to provide an improved construction over that shown in my prior application Serial No. 502,847.

Another object of the invention is to provide an ejecting mechanism for automatically ejecting the heels at a given point.

A still further object of the invention is to provide a cutter or trimming mechanism for cutting the fronts of heels of footwear.

The construction includes a rotatable platform for moving the heels past a cutting member and an improved ejecting mechanism which may be adjusted for different size heels without interfering with the automatic operation of the machine.

In the accompanying drawings—

Fig. 2 is a fragmentary view similar to Fig. 1 but showing the parts including the ejector in a different position;

Fig. 3 is a fragmentary sectional view through Fig 2, approximately on the line 3—3.

Fig. 4 is a detail sectional view through Fig. 2, approximately on the line 4—4;

Fig. 5 is a fragmentary sectional view through Fig. 3, approximately on the line 5—5;

Fig. 6 is a bottom plan view of an adjusting toothed member embodying certain features of the invention;

Fig. 7 is a plan view of the cams forming part of the adjusting mechanism.

Figure 1:
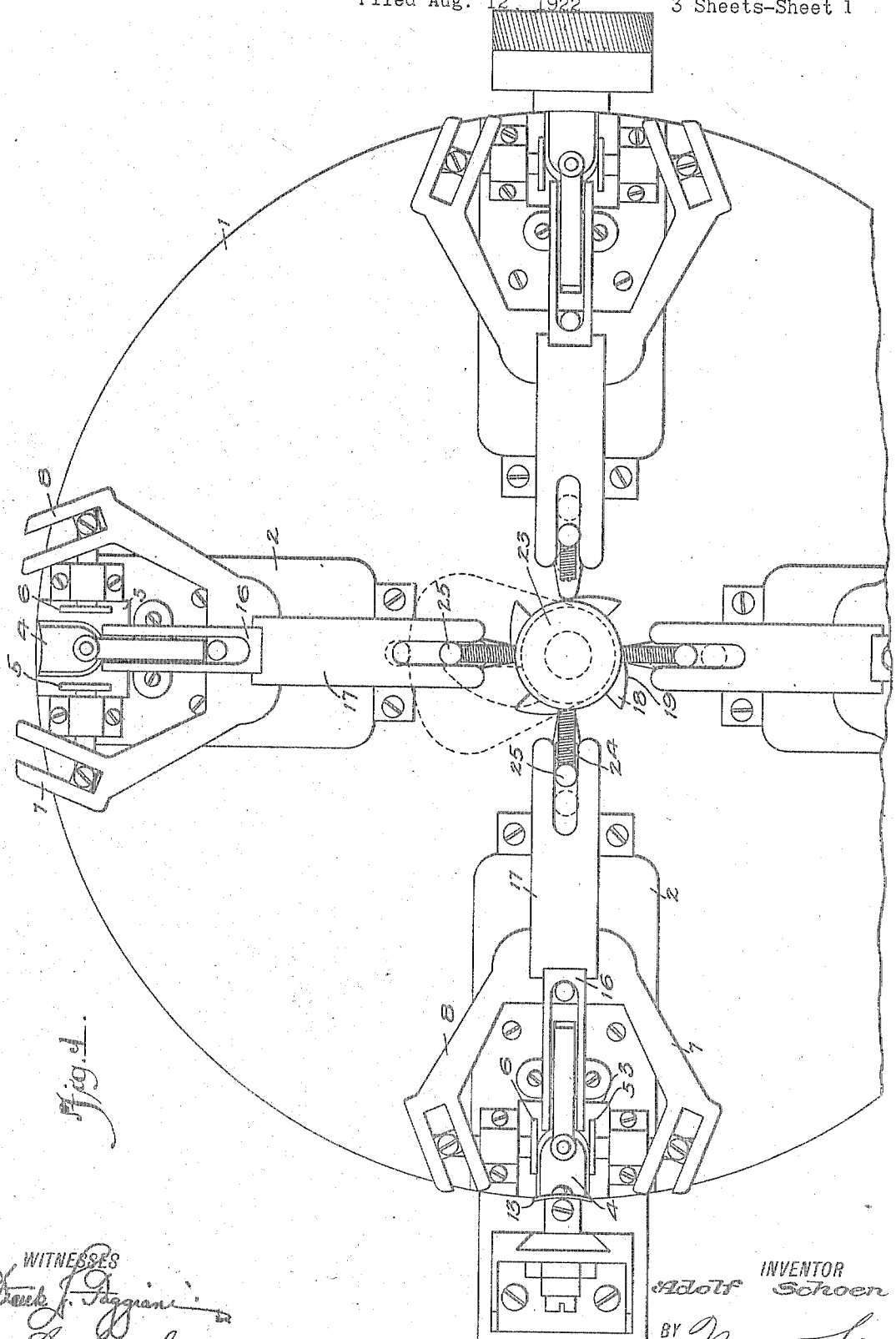
Figure 1 is a plan view of the heel cutting machine similar to that illustrated in my above-mentioned co-pending application and showing an ejecting mechanism embodying the invention applied thereto.

Referring to the accompanying drawings by numeral, 1 indicates a turntable which may be operated in any suitable manner such as described in my co-pending application above mentioned, said turntable being provided with platforms 2 for receiving the heels, said platforms in turn being supplied with cutting blocks 3 of fiber or other desired material on which the various heels 4 are adapted to be placed. The heels 4 when placed in position are grasped by the clamping plates 5 and 6 operated by the cam members 7 and 8, which in turn are actuated by the reciprocated plate 9 carrying an abutment 10. This abutment is engaged and moved in one direction by the cam 11 while a retractile spring 12 is connected with the plate 9 for retracting the same whenever permitted. The construction just described is fully set forth in the above mentioned application, and, therefore, forms no part of the present invention except in combination with the ejecting mechanism hereinafter fully described.

It will be noted that the mechanism just described is adapted to receive heels 4 at a given point and as the turntable 1 moves, the clamping plates or members 5 and 6 will grip the heels and hold the same rigidly in place until the heels have been properly operated upon by the cutter 13, after which the heels are moved to a given point and discharged as indicated in Fig. 2. In order to effect this discharge automatically and at the desired time, an ejecting cam 14 is rigidly secured in any suitable manner to the cam 11, whereby it will operate in proper time therewith. The cam 14 is intended to engage at the proper time the abutment 15 secured in any desired manner with the sliding bar 16, which bar is slidingly mounted in a support 17. The support 17 is secured in any desired manner to the turntable and is held rigidly in position so that the bar 16 may freely reciprocate therein. At the inner end the bar 16 is rounded and the rounded end is adapted to engage at the desired point with one of the teeth 18 of the toothed member 19. This toothed member is provided with a number of apertures 20 into which the respective pins 21 are adapted to project when the parts are in assembled position. The pins 21 are mounted in a member 22 which is rigidly secured to the turntable 1 and consequently rotates therewith whereby there will be no relative movement between the turntable 1 and the toothed member 19. The toothed member 19 is held rigidly in place by any suitable means, as, for instance, a screw member 23. The screw member 23 also acts as a standard or post for receiving the respective springs 24, which springs are connected with an auxiliary post 25 secured to the respective sliding bar 16, so that said sliding bars will have a tendency to continually remain in their inner position and against the toothed member 19. However, when the turntable 1 rotates to a certain position the abutment 15 will engage the cam 14 and as said cam as well as the cam 11 is stationary, the abutment 15 will be forced radially outwardly and the sliding bar 16 will be forced outwardly against the action of the spring 24. The sliding bar 16 at the outer end is bifurcated and provided with suitable turned down ejecting ends 26 which engage the heel 4 and force the same outwardly when the bar 16 is forced outwardly by the action of the cam 14. At the top of Fig. 2 the outer position of these members will be seen as the heel has been ejected or moved as far as the mechanism has been set to move the same. Preferably this ejecting movement is sufficient to cause the heel to fall off the turntable 1, but this movement could be lesser or greater as desired.

As soon as the heel has been ejected as shown at the top of Fig. 2, the parts move to the position shown in Fig. 1, without, however, stopping. As soon as the parts reach the position shown in Fig. 1, the turntable 1 stops and a new heel is inserted to take the place of the one just ejected, said insertion taking place in the position shown at the top of the device as illustrated in Fig. 1.

As the machine continues to operate, the members 5 and 6 will grip the recently inserted heel as soon as the abutment 10 moves off the cam 11 and remains in this gripping position until the cam 11 is again engaged.

Referring to the toothed member 19, it will be noted that this arrangement permits a variation of the inner movement of the several ejecting bars 16 so as to accommodate different size heels. These ejecting bars are adjusted so that the ejecting ends 26 will act as an abutment for the operator, whereby when the operator places the heel in position, said heel will be forced inwardly until it strikes the end 26. This arrangement permits the operator to accurately position the heel without using any particular care, and, consequently, the operation of feeding the heels to the device may be carried on rapidly.

What is claimed is:

1. In a heel-cutting machine, a turntable, a plurality of spaced means for gripping heels mounted on said turntable, and means arranged adjacent said turntable for cutting said heels as they move to position past said means, and ejecting means for ejecting said heels after the cutting operation, said ejecting means including a reciprocating bar having an ejecting end, means for setting said reciprocating bar so that said ejecting end will act as a gage when inserting a new heel, and a cam for moving said bar in one direction.

2. In a heel-cutting machine of the character described, an ejecting mechanism comprising a reciprocating bar, a support for guiding said bar, the bar having at one end a bent portion acting as a limiting member for determining the position of the heel in the cutting machine, an abutment connected to the opposite end of said bar, a spring acting to move said bar radially inwardly, and a stationary cam acting on said abutment as the same moves with the operation of the cutting machine for shifting the bar to the ejecting position against the action of said spring.

3. In a heel-cutting machine, a rotatable platform, means on the platform located at spaced intervals and adapted to receive and grip heels to be cut, an ejecting sliding bar formed with a bent end acting as a stop for limiting the insertion of a heel, a spring for moving said bar in one direction, a cam for moving the bar in the opposite direction, and an adjustable toothed member having arc-shaped faces engaging said bar for adjusting the same for varying the size of heels to be cut.

4. In a heel-cutting machine of the character described, an adjusting mechanism including a reciprocating bar having a depending end, said end acting as ejecting fingers and as a stop, and an adjustable toothed member formed with arc-shaped faces, said toothed member being positioned to engage said bar so that it is adjustable, the inward movement of the bar is limited, and consequently the stop is positioned inwardly or outwardly according to the size of heel to be cut.

5. In a heel-cutting machine of the character described, a turntable, a plurality of spring-actuated clamps carried by said turntable, said clamps being adapted to receive heels to be cut, a cutter arranged adjacent said turntable, means for moving said cutter to effect a cutting of the heels carried by said clamps, means for temporarily stopping said turntable while said cuttter is effecting a cutting operation, and an ejecting mechanism for ejecting said heels, said ejecting mechanism operating during the movement of said turntable, said ejecting mechanism including a stationary cam, a reciprocating ejecting bar having one end engaging the heels in said clamps, and the other end engaging said cam, and a spring for removing said bar.

ADOLF SCHOEN.